Patented Dec. 12, 1933

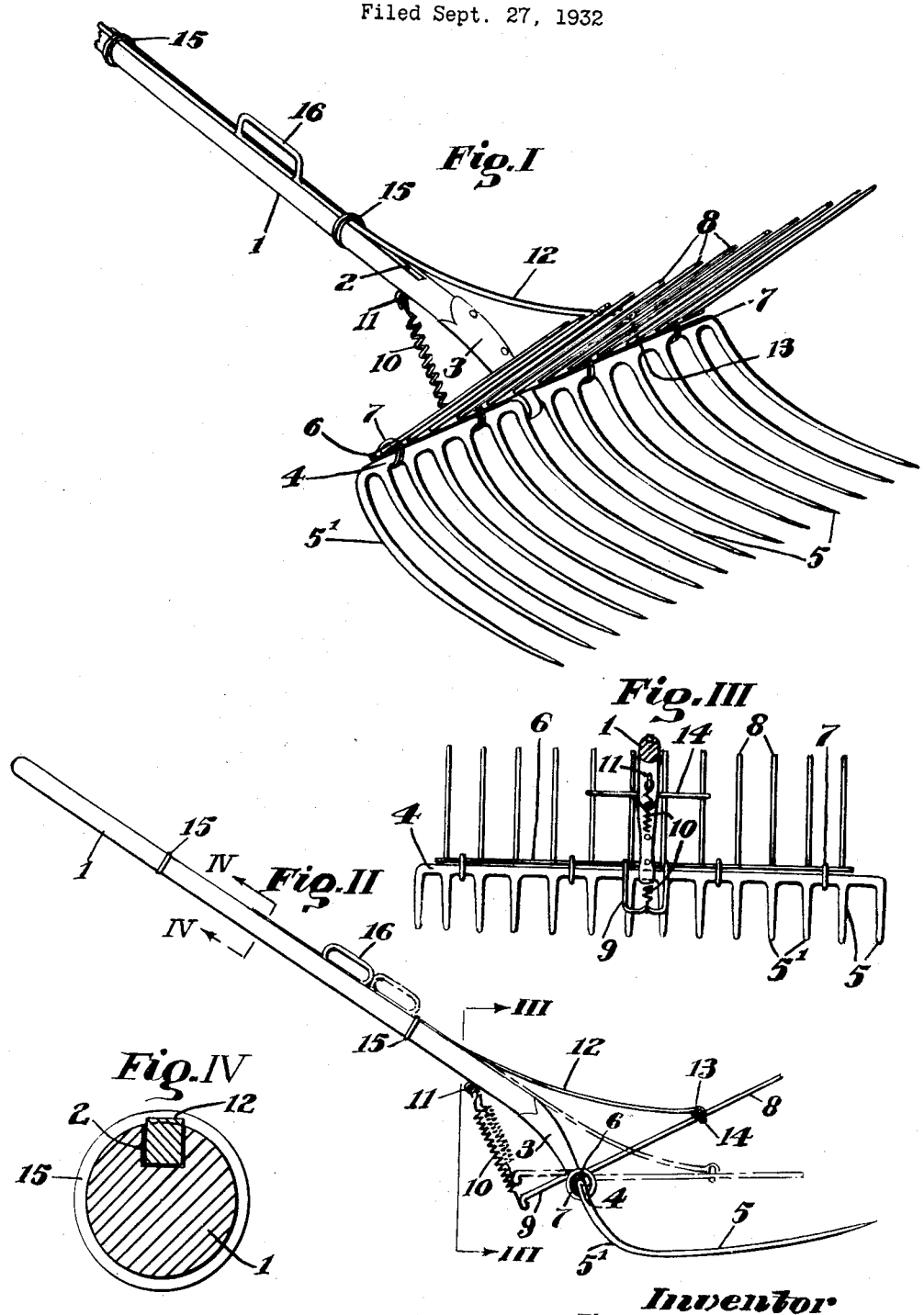

1,939,475

UNITED STATES PATENT OFFICE 1,939,475

GATHERING IMPLEMENT

John Walsh, Jamaica Plain, Mass.

Application September 27, 1932
Serial No. 635,028

2 Claims. (Cl. 294—53)

My invention relates to a gathering implement for leaves, grass, or other trimmings and like waste. It has been proposed to provide rake-like devices which would gather up material with some sort of guard or retainer which would prevent the material from falling off or blowing away after it had been gathered.

My invention provides a new and improved implement having various advantages as will hereinafter appear and which is at the same time simple and inexpensive and of very efficient operation.

Throughout the specification and drawings like reference characters are employed to indicate corresponding parts, and in the drawing:

Fig. I is a view of a device in accordance with my invention.

Fig. II a side view of the same.

Fig. III a fragmentary end view, and

Fig. IV is a section on the line IV—IV of Fig. II.

In such a tool as I have herein shown the handle member 1 is formed with a longitudinal groove 2 on its upper side. The handle end has a slightly bent neck 3 on which is mounted a fork-like head consisting of cross bar 4 on which are carried a plurality of spaced tines 5. These are bent as at $5^1$ at a slight reverse from the curve of the neck 3 so that the straighter portions of the tines 5 lie at an angle to the handle axis.

Pivoted to the cross member 4 of the tined head is a cooperating keeper member. This consists of a cross member 6 which may be conveniently connected to the member 4 by rings 7 disposed at intervals between the keeper tines 8. Extending rearwardly from the cross member 6 is a control lever formed as a loop 9. To this is connected a spring 10 hooked at its opposite end at 11 to the handle 1, normally urging the keeper tines toward the fork.

The keeper is raised against the action of the spring 10 by control rod 12. Its end is looped as at 13 about a short cross piece 14. The upper part of the rod 12 is slidably held in the groove 2 of the handle by friction rings 15 and is provided between its ends with a finger hook 16.

The device may be used with its keeper up or down and as a fork or rake. In most uses as in gathering leaves the material is first "raked" together and then collected on the fork for transfer to the truck or cart.

What I therefore claim and desire to secure by Letters Patent is:—

1. A gathering implement for leaves and the like, comprising a handle, a tined gathering head rigidly secured to the lower end of the handle and comprising a cross bar and a plurality of forwardly directed tines, a tined keeper member pivoted to the cross bar of the gathering head and comprising a cross bar superposed on said cross bar of the gathering head and having a plurality of forwardly directed tines, rings encircling the cross bars of said gathering head and keeper members and disposed at intervals between the respective tines of said members, an arm rigid with the cross bar of the keeper member and extending rearwardly beyond the pivotal connection thereof with the cross bar of the gathering head, a spring connecting the rear end of said arm to said handle and normally urging the keeper towards the gathering head, and a control member connected at its forward end to the keeper member and extending rearwardly and upwardly along the handle for manual manipulation to swing the keeper member away from the gathering head against the action of said spring.

2. A gathering implement as claimed in claim 1, wherein the arm is formed as a U-shaped yoke, the lateral portions of which are connected at their free ends to the cross bar of the keeper member at either side of the handle and the connecting cross portion of which is disposed beneath the handle and constitutes an anchorage for the adjacent end of said spring.

JOHN WALSH.